(12) United States Patent
Agematsu et al.

(10) Patent No.: US 6,208,047 B1
(45) Date of Patent: Mar. 27, 2001

(54) MOTOR

(75) Inventors: Ikuo Agematsu; Kiyoshi Wakai; Yoshinori Ogawa; Yukinobu Yumita; Katsumi Matsumoto, all of Nagano (JP)

(73) Assignee: Kabushiki Kaisha Sanyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/473,123

(22) Filed: Dec. 28, 1999

(30) Foreign Application Priority Data

Dec. 28, 1998 (JP) .................................................. 10-377372
Oct. 8, 1999 (JP) .................................................. 11-288676

(51) Int. Cl.$^7$ .................................................. H02K 37/10
(52) U.S. Cl. ........................................ 310/49 R; 310/254
(58) Field of Search .................................. 310/49 R, 156, 310/254, 266; 29/596–598

(56) References Cited

U.S. PATENT DOCUMENTS

| 4,381,465 | * | 4/1983 | Renkl et al. ........................ 310/49 R |
| 5,751,089 | * | 5/1998 | Stridsberg ............................ 310/266 |
| 5,831,356 | * | 11/1998 | Aoshima ............................ 310/49 R |
| 5,945,753 | * | 8/1999 | Maegawa et al. .................. 310/68 B |
| 6,046,517 | * | 4/2000 | Sasaki et al. ...................... 310/40 MM |

* cited by examiner

*Primary Examiner*—Tran Nguyen
(74) *Attorney, Agent, or Firm*—Sughrue, Mion, Zinn, Macpeak & Seas, PLLC (57) ABSTRACT

A motor incorporates a rotor 21 incorporating a cylindrical magnet 24 which has segments magnetized at predetermined pitches in a circumferential direction thereof; and a stator 25 for imparting a rotating magnetic field to the magnet 24 so as to rotate the rotor 21. Each of the magnetized segments is magnetized such that the inner portion and the outer portion are magnetized to different polarities and the magnetized segments disposed at adjacent pitches are magnetized to opposite polarities. The stator 25 incorporates a first polar tooth row and a second polar tooth row each of which is constituted by polar teeth corresponding to the predetermined pitches of the magnetized segments such that the polar teeth disposed opposite to the magnetized segments across the magnet are magnetize to different polarities, and the polarities of the first polar tooth row and the second polar tooth row are switched so that a rotating magnetic field is imparted to the cylindrical magnet 24. In the embodiment, the first polar tooth row and the second polar tooth row consisting of polar teeth disposed opposite to one another cross the magnet 24 are composed of two pairs including one pair constituted by a core 26 and a stator cap 30 and one pair constituted by a core 27 and a stator cap 31.

12 Claims, 8 Drawing Sheets

PRIOR ART

FIG. 16

PRIOR ART

FIG. 17

MOTOR

BACKGROUND OF INVENTION

1. Field of Invention

The present invention relates to a motor structured such that magnetization of the rotor thereof and layout of polar teeth of the stator thereof are devised to realize a high speed and large torque, and more particularly to a motor for use as a stepping motor.

2. Relate Art

Stepping motors are widely used in a variety of industrial fields. The stepping motor must realize high speed and large torque. To realize the high speed and large torque, efficient exertion of the magnetic flux generated in the polar teeth on the magnet in the rotor so as to raise the efficiency of use of the magnet is an important factor.

Figure 14:
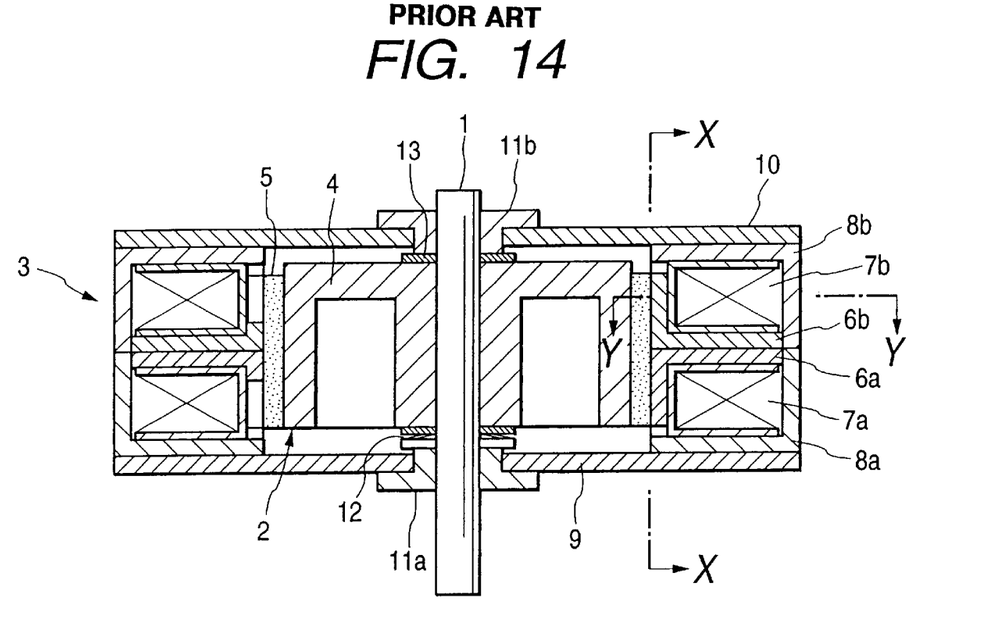
FIG. 14 is a cross sectional view showing the structure of a conventional stepping motor.

FIG. 14 shows the structure of a conventional stepping motor which is schematically constituted by a rotor 2 having a rotational shaft 1; and a stator portion 3 disposed to surround the rotor 2. The rotor 2 is constituted by a cylindrical boss 4 and a cylindrical magnet 5 disposed around the boss 4.

The stator portion 3 incorporates cores 6a and 6b disposed to form two stages and arranged t serve as stator members; coils 7a and 7b wound around the cores 6a and 6b and arranged to serve as wound coils; and stator caps 8a and 8b which are stator members also serving as caps. The opposite surfaces of the cores 6a and 6b and the magnet 5 of the stator caps 8a and 8b are provided with polar teeth T11, T12, . . . , T21, T22, . . . , (refer to FIG. 15 or 16).

The rotor 2 and the stator portion 3 are held by a joining plate 9 and an upper cover 10 joined to the two ends (in the vertical direction in FIG. 14) of the rotor 2. The joining plate 9 and the upper cover 10 are provide with bearings 11a and 11b. The foregoing rotational shaft 1 is rotatively supported by the bearings 11a and 11b. A disc spring 12 is sandwiched between the rotor 2 and the bearing 11a, while a washer 13 is sandwiched between the rotor 2 and the bearing 11b.

Figure 15:
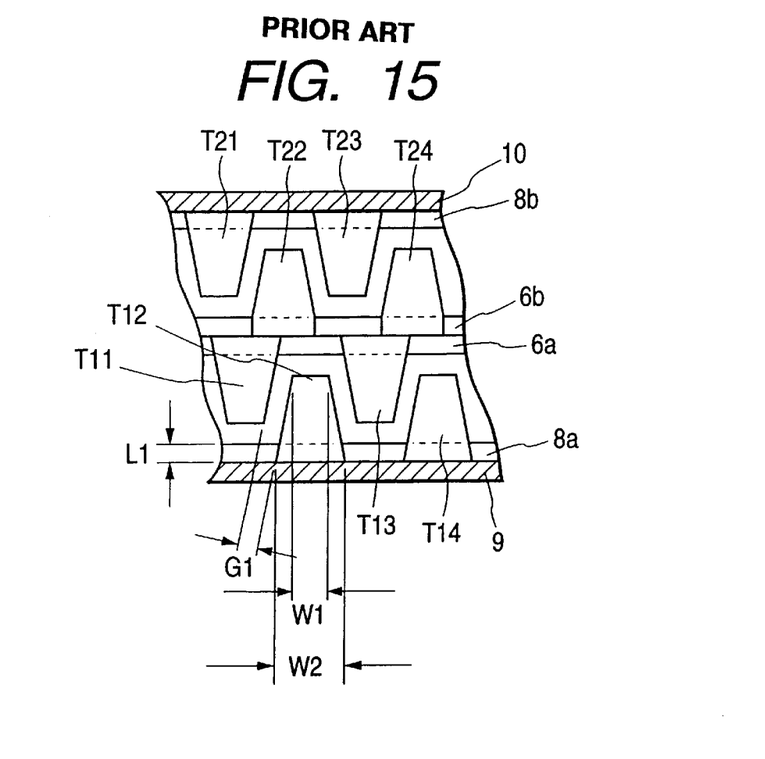
FIG. 15 is a cross sectional view taken along line indicated with arrows x—x shown in FIG. 14.

FIG. 15 is a cross section l view taken along line indicated with arrows X—X shown in FIG. 1 and arranged to show the layout of polar teeth provided for the cores 6a and 6b of the stator portion 3 and the stator caps 8a and 8b. As can be understood from FIG. 15, the polar teeth T11 and T13 of the polar teeth T11, T12, T13 and T14 are provided for the core 6a of the stator portion 3. The polar teeth T12 and T14 are provided for the stator cap 8a. That is, the polar teeth T11, T12, T13 and T14 are alternately provided for the core 6a and the stator cap 8a. Also the core 6b and the stator cap 8b are similarly structured.

Figure 16:
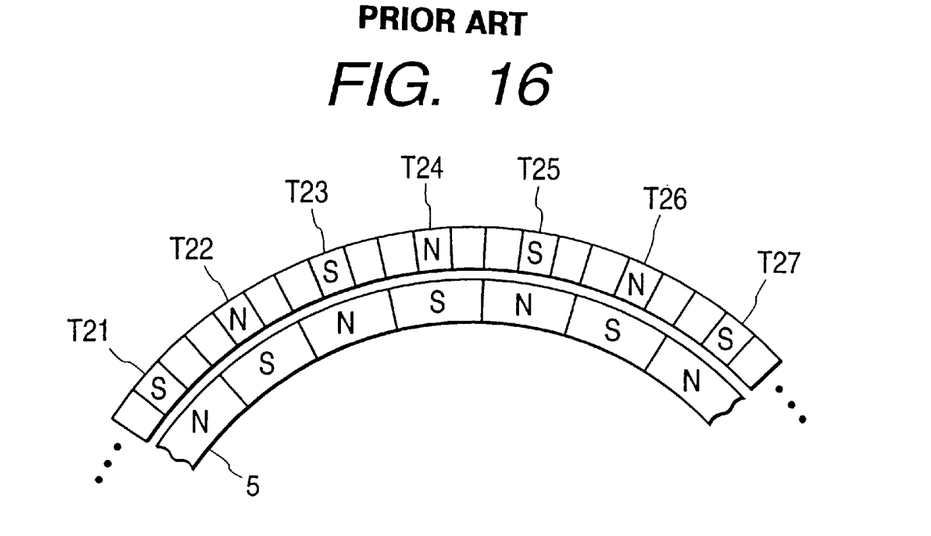
FIG. 16 is a cross sectional view taken along a line indicated with arrows y—y shown in FIG. 14 to schematically show the positional relationship among the polar teeth and the magnet.

FIG. 16 is a cross sectional view taken along a line indicated with arrows Y—Y shown in FIG. 14. The relationship among the polar teeth of the core 6b and the stator cap 8b and the magnetized segments of the magnet 5 is schematically shown.

As shown in FIG. 16, the palar teeth T21, T22, T23, T24, . . . , are disposed apart from the outer surface of the magnet 5 for a predetermined distance to form a line such that the polar teeth are mutually engaged to one another in the circumferential direction of the magnet 5. As described above, the polar teeth T22 and T24 are provided for the core (the core 6b in the foregoing case) and the polar teeth 21 a d T23 are provided for the stator cap (the stator cap 8b in the foregoing case). That is, the polar teeth are alternately provided for the core 6b and the stator cap 8b.

The foregoing polar teeth T21, T22, T23, T24, . . . , are magnetized in such a way that the adjacent polar teeth are magnetized to opposite polarities. For example, the polar tooth T21 is magnetized to the south pole, the polar tooth T22 is magnetized to the north pole, the polar tooth T23 is magnetized to the south pole and the polar tooth T24 is magnetized to the north pole. Thus, the magnet 5 is brought to a state in which attraction and repulsion forces are exerted on the magnetized segments of the surfaces opposite to the polar teeth T21, T22, T23, T24, . . . , so that the rotor 2 is rotated.

Figure 17:
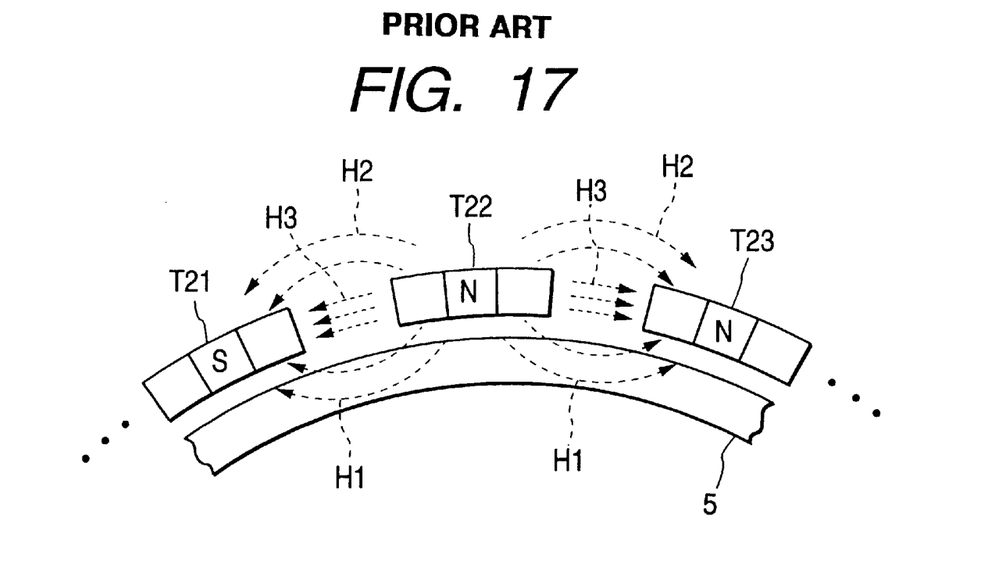
FIG. 17 is a diagram showing flows of magnetic flux occurring in the positional relationship among the polar teeth and the magnet shown in FIG. 14.

The conventional stepping motor having the above-mentioned structure, however, encounters a problem in that the efficiency of using the magnetic flux gene rated in the stator portion 3 is unsatisfactory. That is, as shown in FIG. 17, flows of the magnetic flux generated by the polar teeth T21, T22, T23, T24, . . . , include magnetic flux Hi which is exerted on the magnet 5 and a multiplicity of leaked magnetic flux portions, such as magnetic flux H2 which flows along the reverse surface of the polar teeth T21, T22, T23, . . . , and magnetic flux H3 which flows in between adjacent polar teeth.

Therefore, only a portion of the magnetic flux which is exerted on the magnet 5 is used. That is, the effective magnetic flux which is exerted on the magnet 5 to rotate the rotor 2 is only the magnetic flux H1 in a case of the structure shown in FIG. 17. The other flux is wasted. Therefore, only the magnetic flux Hi which is exerted on the mag et 5 is used as the output of the motor. As a result, a satisfactory efficiency cannot be realized.

The conventional structure incorporates the polar teeth T11, T12, . . . , T21, T22, . . . , arranged in a line such that the adjacent polar teeth have different polarities. Therefore, gap Gi (see FIG. 15) must be formed between polar teeth. Therefore, design of the polar teeth is considerably limited. The foregoing fact will now be described with reference to FIG. 15. Each of the polar teeth T11, T12, . . . , T21, T22, . . . , has the trapezoidal shape. Both of the width W1 of the leading end of the trapezoid and the width W2 of the base of the same must be not larger than magnetizing pitch of the magnet 5. Moreover, gap G1 between the polar teeth having a size similar to the thickness (L1) of each of the stator caps 8a and 8b must be provided. To meet the foregoing requirements, the size, shape and the arrangement of the polar teeth are inevitably limited. Therefore, design of the stepping motor is considerably limited.

SUMMARY OF INVENTION

An object of the present invention is to provide a motor which is capable of efficiently exerting magnetic flux generated in the stator portion to the magnet of the rotor, therefore, realizing high speed and high torque and considerably relaxing limits of the shape and arrangement of the polar teeth to permit freedom to be given when the motor is designed.

According to an aspect of the present invention, there is provided a motor comprising: a rotor containing a cylindrical magnet having segments magnetized at predetermined pitches in a circumferential direction thereof, each of said magnetized segments being magnetized such that the inner portion and the outer portion are magnetized to different polarities and said magnetized segments disposed at adjacent pitches are magnetized to opposite polarities; and a stator for imparting a rotating magnetic field to said magnet so as to rotate said rotor, said stator containing a first polar tooth row and a second polar tooth row each of which is constituted by polar teeth corresponding to the predetermined pitches of said magnetized segments such that said polar teeth disposed opposite to said magnetized segments across said magnet are magnetized to different polarities, and the polarities of said first polar tooth row and said second polar tooth row being switched so that a rotating magnetic field is imparted to said cylindrical magnet.

As described above, the claimed motor has the structure that the first polar tooth row and the second polar tooth row are disposed in the circumferential direction on the inside and outside of the magnet across the magnet. The opposite polar teeth of the first polar tooth row and the second polar tooth row are magnetized to different polarities. Moreover, the inside and outside of the magnet are magnetized to different polarities. Therefore, magnetic flux efficiently flows between the opposite polar teeth. Thus, waste of the magnetic flux which acts on the magnet can be prevented. Moreover, acting force on the magnetic flux of the magnet can be enlarged. As a result, a high speed and large torque motor can be realized.

DETAILED DESCRIPTION OF PREFERRED EMBODIMENTS

First Embodiment

A first embodiment of the present invention will now be described with reference to FIGS. 1 to 5.

Figure 1:
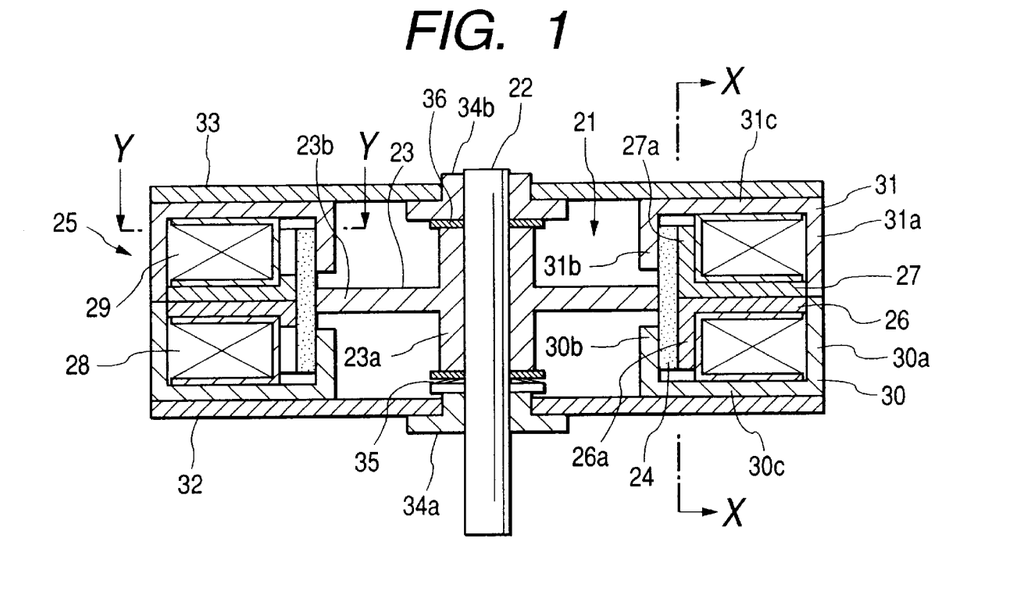
FIG. 1 is a cross sectional view showing the structure of a motor according to a first embodiment of the present invention.

FIG. 1 is a diagram showing the structure of a stepping motor which is a motor according to the present invention.

Referring to FIG. 1, a rotor 21 incorporates a boss 23 secured to a rotational shaft 22 and a magnet (hereinafter simply called a "magnet") 24 made of rare earth material. The boss 23 incorporates a cylindrical rotational-shaft support portion 23a secured to the rotational shaft 22; and a flange 23b formed into a disc shape molded integrally with a portion adjacent to the central portion of the side surface of the rotational-shaft support portion 23a.

Figure 3:
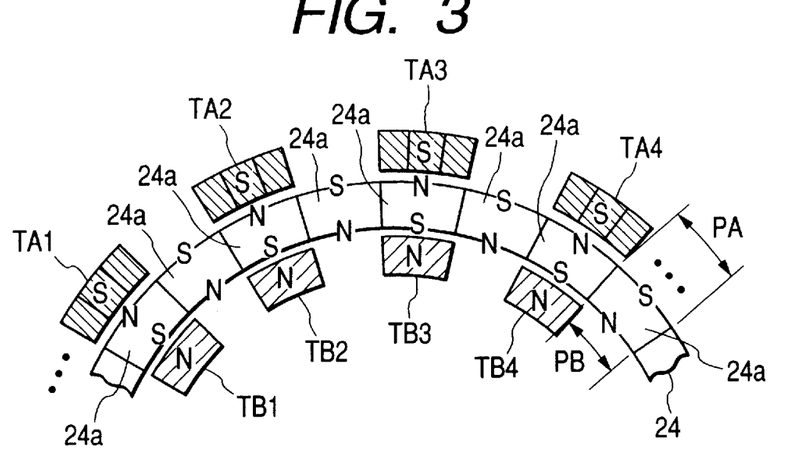
FIG. 3 is cross sectional view taken along a line indicated with arrows y—y shown in FIG. 1 to schematically show the positions of the polar teeth and the magnet.

A cylindrical magnet 24 is joined to the leading end of the flange 23b. That is, the leading end of the flange 23b is secured to the central portion of the inner surface of the cylindrical magnet 24, the central portion being a central portion in the direction of the height of the cylindrical magnet 24. In the first embodiment, the cylindrical magnet 24 has the two ends which are opened. As shown in FIG. 3, the magnet 24 has magnetized segments 24a formed at predetermined pitches. The inner portion and the outer portion of each of the magnetized segments 24a are magnetized to different polarities. Moreover, the directions of magnetization of the adjacent magnetized segments 24a are made to be opposite directions. Since also the inner surface of the magnet 24 is used in addition to the outer surface of the magnet 24, a uniform inner diameter is formed. To mold the magnet 24 as described above, the magnet 24 is obtained by compression molding or injection molding by using rare-earth bond magnet as the material.

As shown in FIG. 1, a stator portion 25 is disposed on the outside of the magnet 24 to surround the outer surface of the magnet 24. The stator portion 25 incorporates two cores 26 and 27 disposed to form two stages; coils 28 and 29 wound around the cores 26 and 27; and stator caps 30 and 31 also serving as a case of the motor.

Figure 2:
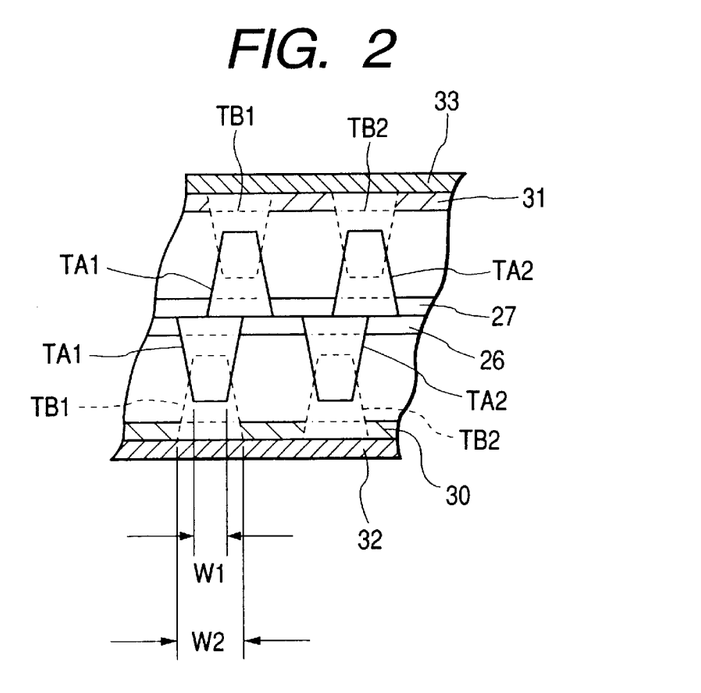
FIG. 2 is a cross sectional view taken along a line indicated with arrows x—x shown in FIG. 1

As shown in FIGS. 2 and 3 polar teeth TA1, TA2, TA3, . . . , forming a first polar tooth row are provided for each of surfaces 26a and 27a of the cores 26 and 27 opposite to the magnet 24. On the other hand, the stator caps 30 and 31 are provided with projections 30b and 31b formed opposite to the inner surface of the magnet 24. The projections 30b and 31b are provided with polar teeth TB1, TB2, TB3, . . . , which form a second polar tooth row. The cores 26 and 27 are sandwiched in the vertical direction in FIGS. 2 and 3 so as to be held by the two stator caps 30 and 31. Each of the stator caps 30 and 31 has a U-shape cross sectional shape facing side when the cross section taken along the rotational shaft 22 is viewed.

The polar teeth TA1, TA2, TA3 . . . , provided for the surface 26a of the core 26 opposite to the magnet 24 and serving as the first polar tooth row and the polar teeth TB1, TB2, TB3, . . . , provided for the projection 30b of the stator cap 30 opposite to the magnet 24 and serving as the second polar tooth row constitute a pair of polar teeth rows. The polar teeth TA1, TA2, TA3, . . . , provided for the surface 27a of the core 27 opposite to the magnet 24 and serving as the first polar tooth row and the polar teeth TB1, TB2, TB3, . . . , provided the projection 31b of the stator cap 31 opposite to the magnet 2 and serving as the second polar tooth row constitute another pair of the polar tooth row. The polarity of the coil 28 disposed between the core 26 and the stator cap 30 and that of the coil 29 is posed between the core 27 and the stator cap 31 are switched so that a rotating magnetic field is imparted to the magnet 24.

The stator cap 30 will now be described. The stator cap 30 is constituted by a flat portion 30c and projections 30a and 30b formed by bending the two ends of the flat portion 30c in the same direction. The projection 30a of the two projections 30a and 30b forms a portion (a side surface) of the case of the stepping motor. The projection 30b is formed to project over either end surface of the magnet 24 into the inner portion of the magnet 24. As described above, the polar teeth TB1, TB2, TB3, . . . , serving as the second polar tooth row are provided for the projection 30b (see FIGS. 2 and 3). The flat portion 30c of the stator cap 30 is held by a joining plate 32 for joining the stepping motor to another member.

Also the stator cap 31 has the same shape constituted by a flat portion 31c and projections 31a and 31b formed by bending the two ends of the flat portion 31c in the same direction. The projection 31a forms a portion (a side surface) of the case of the stepping motor. The projection 31b is formed to project over another end surface of the ma net 24 into the inner portion of the magnet 24. The polar teeth TB1, TB2, TB3, . . . , serving as the second polar tooth row are provided for the projection 31b (see FIGS. 2 and 3). The flat portion 31c of the stator cap 31 is held by an upper cover 33 which forms a portion of the case of the stepping motor. Note that the upper cover 33, the joining plate 32 and the two stator caps 30 and 31 constitute the case of the stepping motor.

The foregoing joining plate 32 and the upper cover 33 are provided with bearings 34a and 34b. The bearings 34a and 34b rotatively support the rotational shaft 22. A disc spring 35 is sandwiched between the bearing 34a and the rotational-shaft support portion 23a of the rotor 21. A washer 36 is sandwiched between the bearing 34b and the rotational-shaft support portion 23a.

The portion including the core 26 and the stator cap 30 will now be described. The surface 26a of the core 26 provided with the polar teeth TA1, TA2, TA3, . . . , (hereinafter called "outer polar teeth TA1, TA2, TA3, . . . ") and the projection 30b forming the polar teeth TB1, TB2, TB3, . . . , (hereinafter called "inner T21, T22, T23, . . . ) of the stator cap 30 are disposed opposite to each other. The surface 26a of the core 26 downwards projects as shown in FIG. 1, while the projection 30b of the stator cap 30 upwards projects. The cylindrical portion of the magnet 24 is sandwiched between the surface 26a of the core 26 and the. projection 30b of the stator cap 30.

The portion including the core 27 and the stator cap 31 will now be described. The surface 27a of the core 27 provided with the outer polar teeth TA1, TA2, TA3, . . . , and the projection 31b of the stator cap 31 provided with the inner polar teeth TB1, TB2, TB3, . . . , are formed to upwards project as shown in FIG. 1. On the other hand, the projection 31b of the stator cap 31 is formed to downwards project. The cylindrical portion of the magnet 24 is sandwiched between the surface 27a of the core 27 and the projection 31b of the stator cap 31.

FIG. 2 is a cross sectional view taken along a line indicated with arrows X—X shown in FIG. 1 to illustrate the positions of the outer polar teeth TA1, TA2, TA3, . . . , and the inner polar teeth TB1, TB2, TB3, . . . In FIG. 2, the inner polar teeth TB1, TB2, TB3, . . . , are indicated with dashed lines for the convenience of description.

As can be understood from FIG. 2, the portion including the core 26 and the stator cap 30 is structured such that the outer polar teeth TA1 and TA2 provided for the core 26 and the inner polar teeth TB1 and TB2 provided for the stator cap 30 are opposite to one another. Also the portion including the core 27 and the stator cap 31 is structured similarly.

FIG. 3 is a cross sectional view taken along a line indicated with arrows Y—Y shown in FIG. 1. Note that FIG. 3 is a schematic view to easily understand the relationship among the polar teeth and the magnetic poles of the magnet.

Referring to FIG. 3, the number of the outer polar teeth TA1, TA2, TA3, . . . , and that of the inner polarteeth TB1, TB2, TB3, are the same. The outer polar teeth TA1, TA2, TA3, . . . , are formed apart from the outer surface of the magnet 24 for a predetermined distance at predetermined pitches in the circumferential direction of the magnet 24. The inner polar teeth TB1, TB2, TB3, . . . , are formed apart from the inner surface of the magnet 24 for a predetermined distance at predetermined pitches in the circumferential direction of the magnet 24. The predetermined pitches of the outer polar teeth TA1, TA2, TA3, and pitches PA of the outer surfaces of the magnetized segments 24a of the magnet 24 are substantially the same. The predetermined pitches of the inner polar teeth TB1, TB2, TB3, . . . , and pitches PB of the inner surfaces of the magnetized segments 24a of the magnet 24 are substantially the same. The magnet 24 is sandwiched in a radial-directional space between the thus-formed outer polar teeth TA1, TA2, TA3, . . . , and the inner polar teeth TB1, TB2, TB3, . . . .

The polar teeth of the outer polar teeth TA1, TA2, TA3, . . . , and those of the inner polar teeth TB1, TB2, TB3, . . . , disposed to sandwich the magnet 24 are opposite to one another. For example, the south pole is generated in the outer polar teeth TA1, TA2, TA3, . . . , while the opposite north pole is generated in the inner polar teeth TB1, TB2, TB3, . . . As described above, opposite polarities are generated between the outer polar teeth TA1, TA2, TA3, . . . , and the inner polar teeth TB1, TB2, TB3, . . . .

Figure 4:
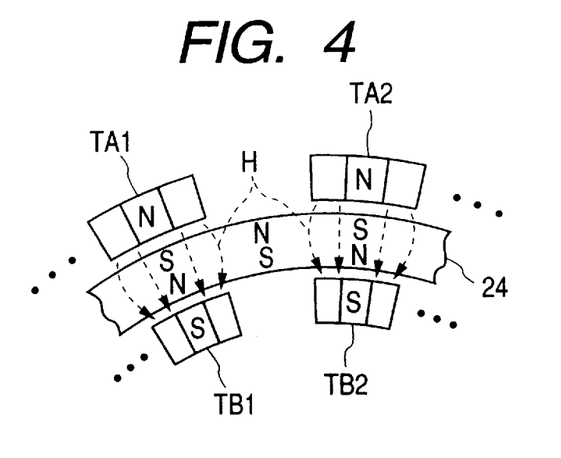
FIG. 4 is a diagram showing flows of magnetic flux occurring in the positional relationship among the polar teeth and the magnet shown in FIG. 3.
Figure 5:
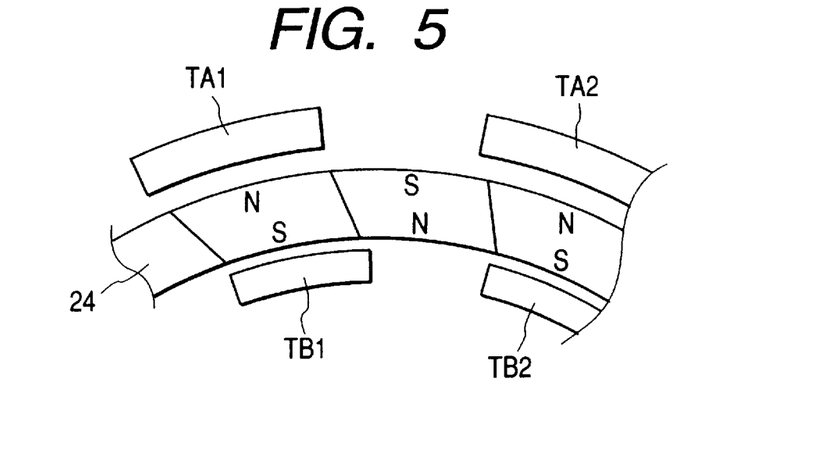
FIG. 5 is a diagram showing an example of the motor shown in FIG. 1 and structured such that the magnetization of the inner surface and that of the outer surfaces of the magnet are slightly shifted and the inner polar teeth and the outer polar teeth are disposed opposite to the magnetized segments of the magnet.

As a result, magnetic flux H between the outer polar teeth TA1, TA2, TA3, . . . , and the inner polar teeth TB1, TB2, TB3, . . . , flows as shown in FIG. 4 from the north-pole outer polar teeth TA1, TA2, . . . , to the south-pole inner polar teeth TB1, TB2, TB3, . . . That is, the polar teeth of the outer polar teethTA1, TA2, TA3, . . . , and the polar teeth of the inner polar teeth TB1, TB2, TB3, . . . , are opposite to one another. The outer polar teeth have the same polarity. Also the inner polar teeth have the same polarity. Therefore, leakage of the magnetic flux between the outer polar teeth and between the inner polar teeth can be prevented. Therefore, the magnetic flux can efficiently be allowed to flow from either polar tooth to the opposite polar tooth.

As a result, the magnet 24 is able to efficiently receive the magnetic flux between the outer polar teeth TA1, TA2, TA3, . . . , and the inner polar teeth TB1, TB2, TB3, . . . On the other hand, the magnetized segments 24a magnetized by the magnet 24 are, as shown in FIG. 4, structured such that the surface opposite to the outer polar teeth TA1, TA2, TA3, . . . , is magnetized to the south pole and the surface opposite to the inner polar teeth TB1, TB2, TB3, . . . , is magnetized to the different polarities.

The outer polar teeth TA1, TA2, TA3, . . . , and the inner polar teeth TB1, TB2, TB3, . . . , are provided as described above to sandwich the magnet 24. Moreover, the opposite polar teeth of the outer polar teeth TA1, TA2, A3, . . . , and the inner polar teeth TB1, TB2, TB3, . . . , are magnetized to opposite polarities. Thus, both of the outer surface and the inner surface of the magnet 24 perform the magnetizing action As a result, the efficiency of using the magnetic flux in the stator portion 25 can be improved. Moreover, the mutual acting force can be enlarged. Thus, the speed of the motor can be raised and the torque can be enlarged.

Since the above-mentioned structure is employed, the adjacent polar teeth of the outer polar teeth TA1, TA2, TA3, . . . , and the inner polar teeth TB1, TA2, TB3, . . . are magnetized to the same polarity. Therefore, a severe limit on the gap between the adjacent polar teeth can be eliminated. As a result, the limit on the design of the shape of the polar teeth can considerably be relaxed. Although the shape of each of the polar teeth according to this embodiment is formed into the trapezoidal shape having the leading end which has a small width and the base portion which has a large width, also the limit of the shape can be relaxed such that, for example, a rectangular shape may be employed.

The width (which is width W2 of the base portion in the structure shown in FIG. 2) of each of the polar teeth may be made to be the same as each of the pitch width PA and PB of the magnetized segments. The width of the polar tooth may be not smaller than each of the pitch widths PA and PB. Assuming that the width of the base portion of each of the outer polar teeth TA1, TA2, TA3, . . . , is W2A, it is preferable that the relationship PA<W2A<2PA is satisfied. Assuming that the width of the leading end is W1A, it is preferable that the relationship WA1<PA is satisfied. Assuming that the width of the base portion of each of the inner polar teeth TB1, TB2, TB3, . . . , is W2B, it is preferable that the relationship PB<W2B<2PB is satisfied. Assuming that the width of the leading end is W1B, it is preferable that W1B<PB is satisfied. In a case where the shape of the polar tooth is rectangular and the widths of the rectangular shape are WA and WB, it is preferable that the relationships PA<WA<2PA and PB <WB<2PB are satisfied. Note that PA and PB correspond to pitch P of the claimed magnetized segment. Moreover, W1A, W1B, W2A, W2B, WA and WB correspond to the length W in the circumferential direction.

The present invention is not limited to the first embodiment which is the preferred embodiment of the present invention. A variety of modifications are permitted within the scope of the present invention. The outer polar teeth TA1, TA2, TA3, . . . , and the polar teeth TB1, TB2, TB3, . . . , are required to be disposed opposite to one another. Moreover, the magnet is required to be sandwiched between the foregoing polar teeth. Therefore, the structure is not limited to the foregoing structure according to the embodiment. Although the foregoing embodiment has the structure that the polar teeth TB1, TB2, TB3, . . . , are provided for the stator caps 30 and 31, the foregoing polar teeth may be provided for the joining plate 32, the upper cover 33 or the case as a substitute for the stator caps 30 and 31.

The foregoing embodiment is structured into the two-cap structure formed by preparing two stator caps 30 and 31 and by sandwiching the cores 26 and 27 by the two stator caps 30 and 31. A one-cap structure may be employed which is formed by two caps are integrated to one cap. Another structure may be employed in which two pairs each consisting of inner and outer cores are laminated so as to be held by one case. Moreover, a cover case is joined.

The outer polar teeth TA1, TA2, TA3, . . . , and the inner polar teeth TB1, TB2, TB3, . . . , are disposed opposite to one another. The state of the opposite disposition relationship is not required to be the complete opposite state. A somewhat displacement is permitted. In the foregoing case, it is preferable that the magnet 24 is structured such that the magnetized segments are shifted in both inner portion and the outer portion to be opposite to the polar teeth. The width W1 of the leading end of each of the polar teeth and the width W2 of the base portion of the trapezoid may satisfy W1>W2 to enlarge the width of the leading end as a substitute for the relationship W1>W2.

Second Embodiment

A second embodiment of the present invention will now be described with reference to FIGS. 6 to 9.

Figure 6:
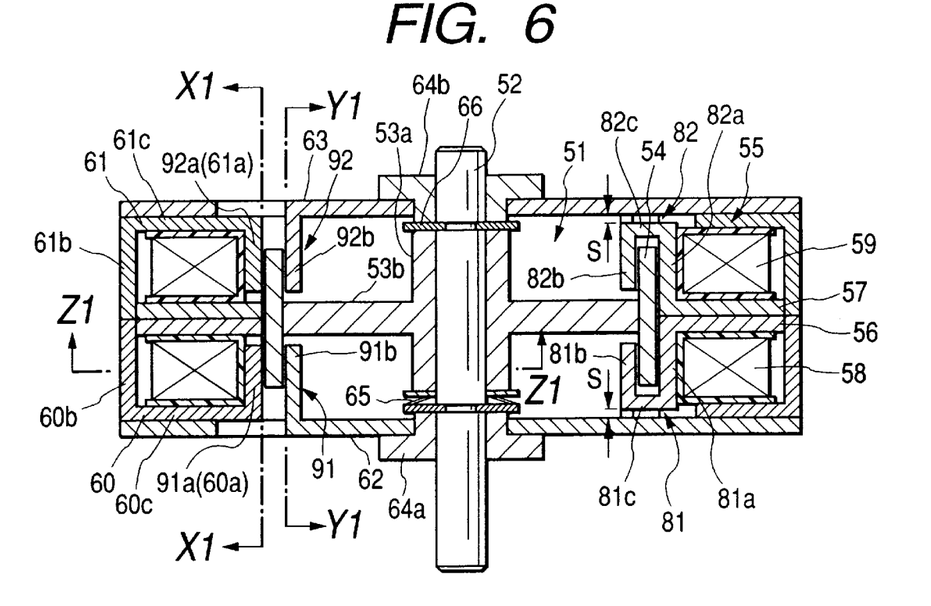
FIG. 6 is a cross sectional view showing the structure of a motor according to the second embodiment of the present invention.

FIG. 6 shows the structure of a stepping motor which is a motor according to another aspe t of the prent invention. A rotor 51 has the same shape as that of the rotor 21 according to the first embodiment. The cylindrical magnet 54 of the rotor 51 has two opened ends. The magnet 54 has magnetized segments 54a (see FIG. 9) formed at predetermined pitched in the circumferential direction of the magnet 54. The inner portion and the outer portion of each of the magnetized segments 54a are magnetized to the same polarity. The adjacent magnetized segments 54a are magnetized to different polarities. To as well as use the inner surface of the magnet 54 in addition to the outer surface of the magnet 54, the inner diameter is made to be uniform. To mold the magnet 54 as described above, the bond magnet made of a rare earth material is employed as the material which is compression molded or injection molded.

A stator portion 55 surrounding the magnet 54 is disposed on the outside of the magnet 54. The cores 56 and 57 of the stator portion 55 have first polar tooth sets 81 and 82 having two polar teeth (for example, TA1' and TB1') disposed opposite to each other across the magnet 54. The first polar tooth set 81 provided for the core 56 is constituted by a sequential U-shape projection formed at an inner end of the core 56. Referring to FIG. 6, the first polar tooth set 81 is form d from the lower end of the magnet 54 to surround the inner and Outer surfaces of the magnet 54.

That is, the first polar tooth set 81 incorporates a polar tooth (hereinafter called an "outer polar tooth") 81a formed by warping the inner end of the core 56 by an angular degree of about 90° to be opposite to the outer surface of the magnet 54; a connection portion 81c formed by warping the leading end portion of the polar tooth 81a to the inside portion of the magnet 54 by an angular degree of about 90°; and a polar tooth (hereinafter called an "inner polar tooth") 81b formed by furthermore warping the end of the connection portion 81c by an angular degree of about 90° to be opposite to the inner surface of the magnet 54. The first polar tooth set 81 is accommodated in the case of the motor in a state in which gap S with which leakage of magnetic flux with respect to the joining plate 62, under which the connection portion 81c is disposed in a state shown in FIG. 6, does not occur.

As shown in FIG. 6, each of the polar teeth 81a downwards projects to constitutes a portion of polar teeth TA1', TA3', TA5', . . . , (see FIGS. 7 and 9) which is a portion of the first polar tooth row disposed on the outside of the magnet 54. Note that each of outer polar teeth 91a provided for a stator cap 60 to be described later is disposed between the thus-formed polar teeth 81a. The outer polar teeth 81a and 91a are alternately disposed as described above. Thus, a first polar teeth TA1', TA2', TA3', . . . , composed of a plurality of polar teeth arranged in a line in the circumferential direction of the outer surface of the magnet 54 is constituted.

Figure 8:
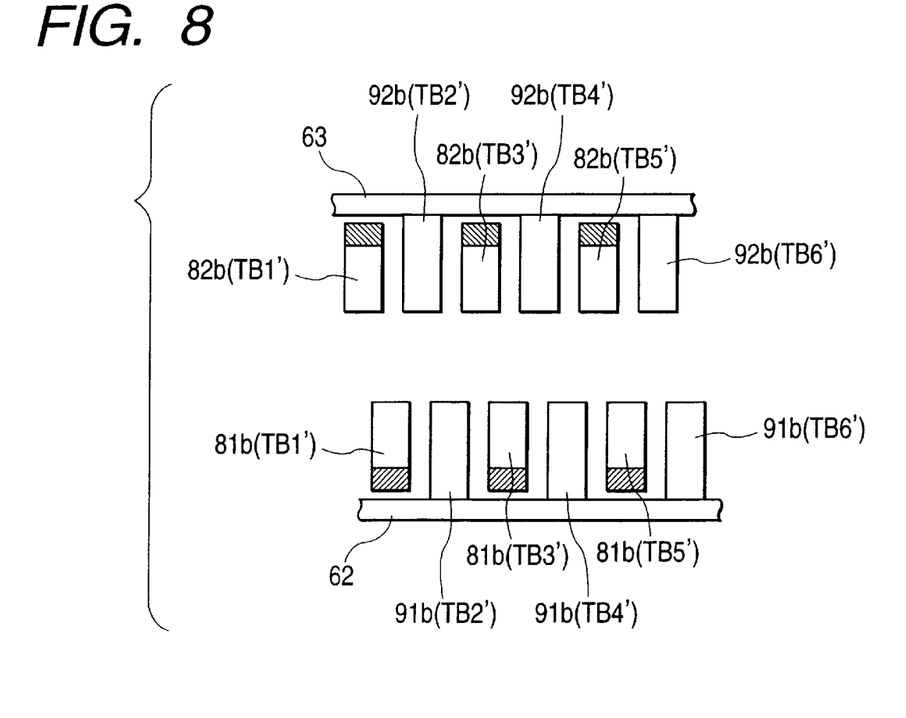
FIG. 8 is a cross sectional view taken along a line indicated with arrows y1—y1 shown in FIG. 6.
Figure 9:
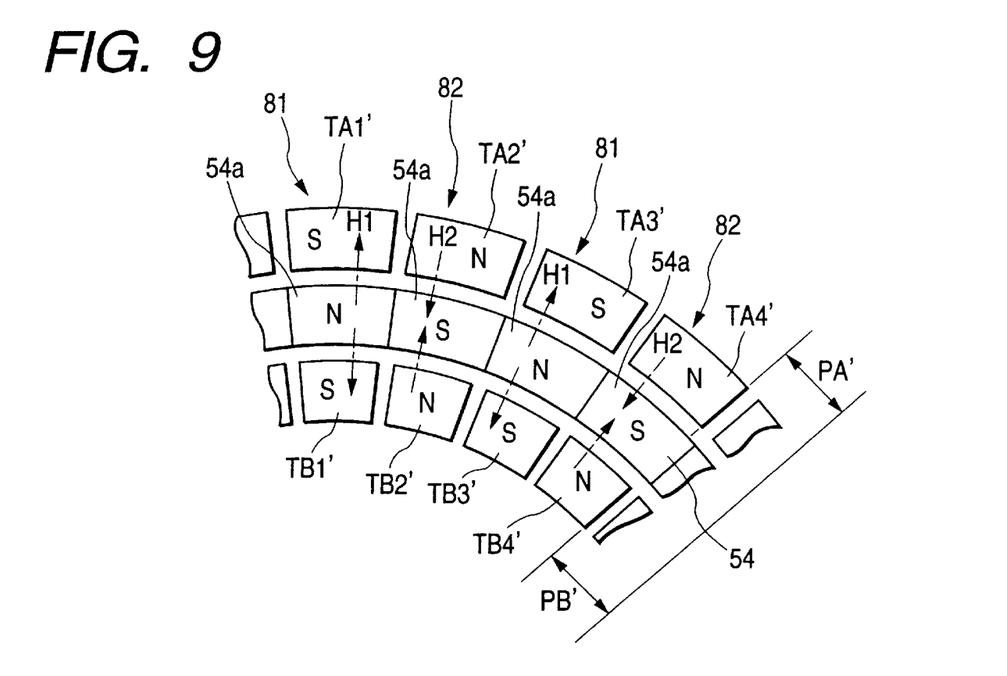
FIG. 9 is a cross sectional view taken along a line indicated with arrows Z1—Z1 shown in FIG. 6 to schematically show the positional relationship among the polar teeth and the magnet and flows of magnetic flux.

On the other hand, each of the polar teeth 81b is formed to upwards project to constitute polar teeth TB1', TB3', TB5', . . . , which form a portion of the second polar tooth row disposed on the inside of the magnet 54 (see FIGS. 8 and 9).

Note that each of the inner polar teeth 91b provided for a joining plate 62 to be described later is disposed between the foregoing polar teeth 81b. Since the inner polar teeth 81b and 91b are alternately disposed as described above, a second polar tooth row TB1', TB2', TB3', . . . , is constituted which is composed of a plurality of polar teeth disposed in a line on the inside of the magnet 54 in the circumferential direction of the magnet 54.

The pair of the polar too the 81a and the inner tooth Bb disposed on the two sides of the magnet 54 formed into the U-shape projection are magnetized to the same polarity. The pair of the polar tooth 81a and the inner tooth 81b and the outer polar tooth 91a and the inner polar tooth 91b of the adjacent second polar tooth set 91 are magnetized to the different polarities. On the other hand, the magnetized segments 54a of the magnet 54 sandwiched between the polar teeth 81a and the polar teeth 81b magnetized to the same polarity are disposed to be magnetized to the polarity different from the polarity of the opposite polar teeth 81a and polar teeth 81b.

Similarly to the first polar tooth set 81, the first polar tooth set 82 provided for the core 57 is constituted by U-shape projections formed at the inner end of the core 57 to surround the inner and outer surfaces of the magnet 54 from the upper end of the magnet 54 when viewed in FIG. 6. That is, the first polar tooth set 82 incorporates the polar tooth (hereinafter called an "outer polar tooth") 82a formed by warping the inner end of the core 57 by about 90° to be opposite to the outer surface of the magnet 54; a connection portion 82c formed by warping the leading end portion of the outer polar tooth 82a to the inner portion of the magnet 54 by about 90°; and a polar tooth (hereinafter called an "inner polar tooth") 82b formed by furthermore warping the end portion of the connection portion 82c by about 90°. The first polar tooth set 82 structured as described above is accommodated in the case of the motor in such a manner that gap S with which leakage of magnetic flux with respect to an upper cover 63, above which the connection portions 82c is disposed in the state shown in FIG. 6, does not occur is maintained.

Each of the outer polar teeth 82a is disposed to upwards project in a state shown in FIG. 6 so that polar teeth TA1', TA3', TA5', . . . , which form a portion Of a first polar tooth row disposed on the outside of the magnet 54 is constituted. Outer polar teeth 92a provided for a stator cap 61 to be described later are disposed between the outer polar teeth 82a formed as described above. Since the outer polar teeth 82a and 92a are alternately disposed as described above, a first polar tooth row TA1', TA2', TA3', . . . , is constituted which is composed of a plurality of polar teeth arranged in a row formed in the circumferential direction around the magnet 54.

On the other hand, the inner polar teeth 82b are formed to downwards project to constitute polar teeth TB1', TB3', TB5', . . . , which form a portion of a second polar tooth row disposed on the inside of the magnet 54. Inner polar teeth 92b of the upper cover 63 to be described later are disposed between the thus-formed inner polar teeth 82b. Since the polar teeth 82b and 92b are alternately disposed, a second polar tooth row TB1', TB2', TB3', . . . , is formed to be in a line in the circumferential direction on the inside portion of the magnet 54.

The pair of the outer polar tooth 82a and the inner polar tooth 82b disposed on the two sides of the magnet 54 constituted by the U-shape projection as described above is magnetized to the same polarity. The outer polar tooth 82a and the inner polar tooth 82b forming a pair with the above-mentioned polar teeth are magnetized to the polarity different from the polarity of each of the outer polar tooth 92a and the inner polar tooth 92b of the adjacent second polar tooth set 92. On the other hand, the magnet 54 is disposed in such a manner that the magnetized segments 54a sandwiched between the outer polar tooth 82a and the inner polar tooth 82b magnetized to the same polarity are magnetized to the polarity opposite to that of the opposite outer polar tooth 82a and the inner polar tooth 82b.

Polar teeth (hereinafter called "outer polar teeth") 91a and 92a constituting a portion of the second polar tooth sets 91 and 92 and formed by projections disposed on the outside of the magnet 54 are disposed on the inside each of the stator caps 60 and 61. The outer polar teeth 91a constitutes TA2', TA4', TB6', . . . , which form a portion of the first polar tooth row disposed on the outside of the magnet 54. Note that the polar teeth 81a provided for the above-mentioned core 56 are disposed between the outer polar teeth 91a so that TA1', TA2', TA3', . . . , which constitute the first polar tooth row are formed. Also the outer polar teeth 92a constitutes a portion of TA2', TA4', TB6', . . . , which form a portion of the first polar tooth row disposed on the outside of the magnet 54. The outer polar teeth 82a provided for the above-mentioned core 57 are disposed between the outer polar teeth 92a so that TA1', TA2', TA3', . . . , which form the first polar tooth row are formed.

Polar teeth 91b (hereinafter called "inner polar teeth") constituting a portion of the second polar tooth set 91 and formed by projections disposed on the inside of the magnet 54 are formed at positions opposite to the magnet 54 of the joining plate 62 laminated on the stator cap 60. The inner polar teeth 91b constitute TB2', TB4', TB6', . . . , which form a portion of the second polar tooth row disposed on the inside of the magnet 54. The polar teeth 81b provided for the above-mentioned core 56 are disposed between the inner polar teeth 91b so that TB1', TB2', TB3', . . . , serving as the second polar tooth row are constituted.

The outer polar teeth 91a provided for the stator cap 60 and the inner polar teeth 91b provided for the joining plate 62 are disposed opposite to one another across the magnet 54 so that the second polar tooth set 91 is constituted. The outer polar teeth 91a and the inner polar teeth 91b disposed opposite to one another across the magnet 54 are magnetized to the same polarity. The magnet 54 is disposed in such a manner that the magnetized segments 54a sandwiched between the outer polar teeth 91a and the inner polar teeth 91b magnetized to the same polarity are magnetized to the polarity opposite to the polarity of the outer polar teeth 91a and the inner polar teeth 91b. The second polar tooth set 91 are magnetized to the polarity opposite to the polarity of the first polar tooth set 81.

Polar teeth (hereinafter called "inner polar teeth") 92b which constitute a portion of the second polar tooth set 92 and which are formed by projections disposed on the inside of the magnet 54 are disposed at positions of the upper cover 63 superimposed on the stator cap 61 opposite to the magnet 54. The inner polar teeth 92b constitute TB2', TB4', TB6', . . . , which form a portion of the second polar tooth row disposed on the inside of the magnet 54. The inner polar teeth 82b provided for the core 57 are disposed among the inner polar teeth 92b so that TB1', TB2', TB3', . . . , which serve as the second polar tooth row are constituted.

The outer polar teeth 92a provided for the stator cap 61 and the inner polar teeth 92b provided for the upper cover 63 are disposed opposite to one another across the magnet 54 so that the second polar tooth set 92 is constituted. The outer polar teeth 92a and the inner polar teeth 92b disposed opposite to one another across the magnet 54 are magnetzed to the same polarity. The magnet 54 is disposed such that the magnetized segments 54a sandwiched between the outer polar teeth 92a and the inner polar teeth 92b magnetized to the same polarity are magnetized to the polarity opposite to the polarity of the opposite outer polar teeth 92a and the inner polar teeth 92b. The second polar tooth set 92 is magnetized to the polarity different from the polarity of the adjacent first polar tooth set 82.

Figure 7:
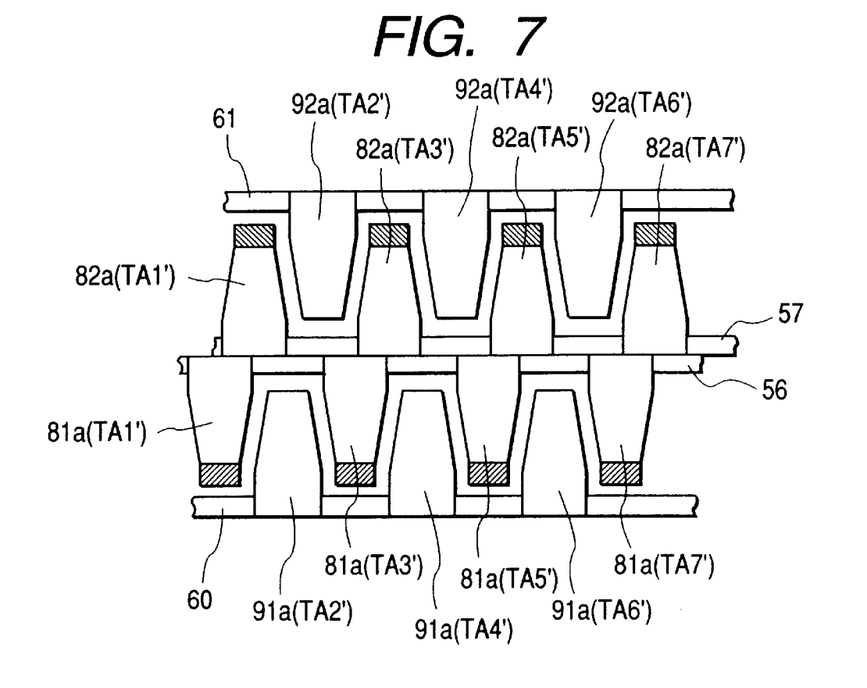
FIG. 7 is a cross sectional view taken along a line indicated with arrows x1—x1 shown in FIG. 6.

The first and second polar tooth rows TA1', TA2', TA3', ..., TB', TB2', TB3', ..., constituted by the first polar tooth set 81 provided for the core 56 disposed in the lower portion in FIG. 6 and the second polar tooth set 91 disposed between polar teeth of the first polar tooth set 81 and the first and second polar tooth rows TA1', TA2', TA3', ..., TB1', TB2', TB3, ..., constituted by the first polar tooth set 82 provided for the core 57 disposed in the upper portion in FIG. 6 and the second polar tooth set 92 disposed between the polar teeth of the first polar tooth set 82 are shifted by a half pitch as shown in FIGS. 7 and 8. When polarity of the coil 58 disposed between the core 56 and the stator cap 60 and that of the coil 59 disposed between the core 57 and the stator cap 61 are switched so that a rotating magnetic field is imparted to the magnet 54.

The stator cap 60 will now be described. The stator cap 60 is constituted by a flat portion 60c and projections 60a and 60b formed by bending the two ends of the flat portion 60c in the same direction. The projection 60a of the two projections 60a and 60b constitutes a portion (a side surface) of the case of the stepping motor. The projection 60b is formed to outwards project over either end surface of the magnet 54 to the outside of the magnet 54. As described above, the polar teeth TA2', TA4', TB6', constituting a portion of the first polar tooth row are provided for the projection 60b (see FIGS. 7 and 9). The flat portion 60c of the stator cap 60 is held by the joining plate 62 for joining the stepping motor to another member.

The other stator cap 61 has the same shape constituted by a flat portion 61c and projections 61a and 61b formed by bending the two ends of the flat portion 61c into the same direction. The projection 61a forms a portion (a side surface) of the case of the stepping motor. The projection 61b is disposed to outwards project over another end surface of the magnet 54 to the outside of the magnet 54. The polar teeth TA2', TA4', TB6', ..., forming a portion of the first polar tooth row are provided for the projection 61b (see FIGS. 8 and 9). The flat portion 61c of the stator cap 61 is held by the upper cover 63 which forms a portion of the case of the stepping motor. The upper cover 63, the joining plate 62 and the two stator caps 60 and 61 constitute the case of the stepping motor.

The joining plate 62 and the upper cover 63 are provided with bearings 64a and 64b. The bearings 64a and 64b rotatively support a rotating shaft 52 of the rotor 51. A disc spring 65 is sandwiched between the bearing 64a and a rotational-shaft support portion 53a of the rotor 51. A washer 66 is sandwiched between the bearing 64b and the rotational-shaft support portion 53a.

FIG. 7 is a cross sectional view taken along a line indicated with arrows X1—X1 shown in FIG. 6 to illustrate the position of the outer polar teeth TA1', TA2', TA3', ... The same elements as those shown in FIG. 6 are given the same reference numerals. As can be understood from FIG. 7, a portion including the core 56 and the stator cap 60 is structured such that the outer polar teeth 81a provided for the core and the outer polar teeth 91a provided for the stator cap 60 are alternately disposed so that the first polar tooth row TA1', TA2', TA3', ..., is constituted. Also a portion including the core 57 and the stator cap 61 is structured similarly.

FIG. 8 is a cross sectional view taken along a line indicated with arrows Y1—Y1 shown in FIG. 6 to illustrate the positions of the inner polar teeth TB1', T;2', TB3', ... The same elements as those shown in FIG. 6 are given the same reference numerals. As can be understood from FIG. 8, a portion including the core 56 and the joining plate 62 is structured such that the inner polar teeth 81b provided for the core 56 and the inner polar teeth 91b provided for the joining plate 62 are alternately disposed so that the second polar tooth row TB1', TB2', TB3', ..., is formed. Also a portion including the core 57 and the upper cover 63 are similarly structured.

FIG. 9 is a schematic cross sectional view taken along line indicated with arrow Z1—Z1 shorn in FIG. 6.

Referring to FIG. 9, the outer polar teeth TA1', TA2', TA3', ..., forming the first polar tooth row are disposed apart from the outer surface of the magnet 54 of the rotor 51 for a predetermined distance at predetermined pitches in the circumferential direction of the rotor 51. The inner polar teeth TB1', TB2', TB3', ..., are disposed apart from the inner surface of the magnet 54 of the rotor 51 for a predetermined distance at predetermined pitches in the circumferential direction of the magnet 54. The predetermined inner and outer pitches are substantially the same as pitches PA' of the outer surfaces of the magnetized segments 54a of the magnet 54 and pitches PB' of the inner surface of the same.

The number of the outer polar teeth TA1', TA2', TA3', and that of the inner polar teeth TB1', TB12', TB3', ..., are the same and the polar teeth of outer and inner rows are disposed opposite to each other. A magnet 54 is sandwiched between the outer polar teeth TA1', TA2', TA3', ..., and the inner polar teeth TB1', TB2', TB3', ...

As described above, the outer polar teeth TA1', TA2', TA3', ..., and the inner polar eeth TB1', TB2', TB3', ..., are disposed opposite to one another across the magnet 54. For example, the south pole is generated in the outer polar teeth TA1', TA3', TA5', ..., and the inner polar teeth TB1', TB3', TB5', ..., provided for the cores 56 and 57. For example, the north pole is generated in the outer polar teeth TA2', TA4', TB6', ..., and the inner polar teeth TB2', TB4', TB6', ..., provided for the stator caps 60 and 61, the joining plate 62 and the upper cover 63. Thus, opposite polarities are generated between the first polar tooth sets 81 and 82 and the second polar tooth sets 91 and 92.

Also the second embodiment is structured similarly to the first embodiment such that also the polar teeth are provided for the inner portion of the magnet 54 in addition to the outer portion of the magnet 54. As a result, magnetic flux can efficiently be allowed to flow to the magnet (refer to arrows H1 and H2 shown in FIG. 9). In the second embodiment, the polar teeth disposed opposite to one another across the magnet 54 are magnetized to the same polarity. Thus, magnetic flux can efficiently be allowed to flow to each of the magnetized segments 54a which has been magnetized one time. As a result, the efficiency of using the magnetic flux in the stator portion 55 can be improved. Moreover, the mutual acting force can be enlarged so that a high speed and large torque motor is realized.

The second embodiment is t e other preferred embodiment of the present invention. Note that the present invention is not limited. A variety of modifications may be permitted within the scope of the present invention. The outer polar teeth TA1', TA2', TA3', ..., and the inner polar teeth TB1', TB2', TB3', ..., are required to be disposed opposite to one another such that the magnet is sandwiched between the outer and inner polar teeth. Moreover, the pair of the polar tooth set disposed opposite to each other are required to be structured such that the U-shape projections and the two polar teeth provided for the superimposed core members are disposed alternately. Therefore, the structure is not limited to the foregoing structure. That is, the first polar tooth sets 81 and 82 constituted by the U-shape projections are provided for the cores 56 and 57, the stator cap 60 formed by superimposing the second polar tooth sets 91 and 92 constituted by the two polar teeth, the joining plate 62, the stator cap 61 and the upper cover 63. In addition, structures shown in FIGS. 10 to 13 may be employed. Modifications shown in FIGS. 10 to 13 will now be described. The same elements as those according to the second embodiment are given the same reference numerals.

Figure 10:
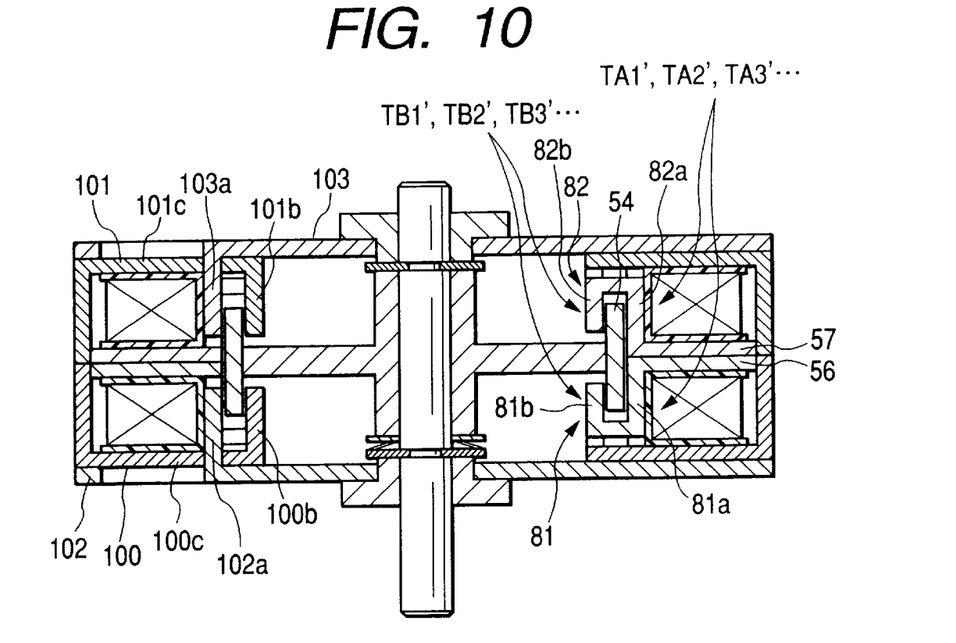
FIG. 10 is a cross sectional view showing the structure of a first modification of the motor according to the second embodiment of the present invention.

FIG. 10 shows a first modification of the second embodiment. Referring to FIG. 10, the first polar tooth sets 81 and 82 constituted by the U-shape projections similarly to those according to the second embodiment are disposed on the inner portions of the central cores 51 and 57. The first polar tooth sets 81 and 82 have the root portions disposed on the outside of the magnet 54 so that TA1', TA3' TA5', ..., which form a portion of the first polar tooth row are constituted. The leading end of the first polar tooth sets 81 and 82 are disposed on the inside of the magnet 54 so that TB1', TB3', TB5', ..., which form a portion of the second polar tooth row are constituted.

In the first modification, a polar tooth (inner polar tooth) 100b formed at an end of a flat portion 100c of a stator cap 100 (corresponding to the foregoing stator cap 60) is allowed to project to be disposed on the inside of the magnet 54. As a result, the second polar tooth row TB1' TB2', TB3', . . . , disposed on the inside of the magnet 54 is constituted by alternately disposing the polar teeth 100b provided for the stator cap 100 and the polar teeth (the inner polar teeth) 81b formed at the leading ends of the first polar tooth set 81. Polar teeth (the inner polar teeth) 101b formed at an end of the flit portion 101b of the stator cap 101 (corresponding to the foregoing stator cap 61) are allowed to project to be disposed on the inside of the magnet 54. As a result, the second polar tooth row TB1', TB2', TB3', . . . , is constituted by alternately disposing the polar teeth 101b provided for the stator cap 101 and the polar teeth (the inner polar teeth) 82b of the first polar tooth set 82.

Polar teeth (outer polar teeth) 102a provided for a joining plate 102 (corresponding to the foregoing joining plate 62) are allowed to project so as to be disposed on the outside of the magnet 54. As a result, the first polar tooth row TA1', TA2', TA3', . . . , disposed on the outside of the magnet 54 is constituted by alternately disposing the outer polar teeth 102a provided for the joining plate 102 and the polar teeth (the outer polar teeth) 81a formed at the leading ends of the first polar tooth set 81. Polar teeth (the outer polar teeth) 103a provided for a stator cap 103 (corresponding to the foregoing upper cover 63) are allowed to project so as to be disposed on the outside of the magnet 54. As a result, the first polar tooth row TA1', TA2', TA3', . . . , disposed on the outside of the magnet 54 is constituted by alternately disposing the polar teeth 103a provided for the upper cover 103 and the polar teeth (the outer polar teeth) 82a formed at the leading ends of the first polar tooth set 82.

Figure 11:
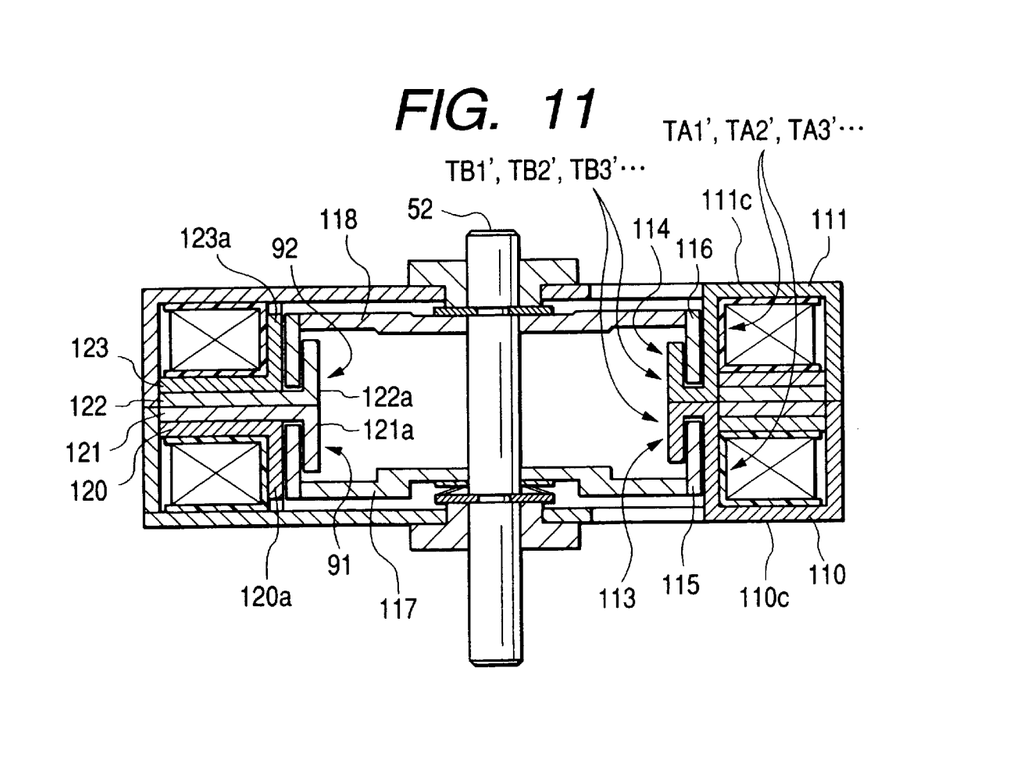
FIG. 11 is a cross sectional view showing the structure of a second modification of the motor according to the second embodiment of the present invention.

FIG. 11 shows a second modification of the second embodiment. Referring to FIG. 11, first polar tooth sets 113 and 114 constituted by U-shape projections are provided for the inside of the stator caps 110 and 111 (corresponding to the stator caps 60 and 61 according to the second embodiment). That is, this modification has the structure that the inner portion of the flat portions 110c and 111c of the stator caps 110 and 111 are extended so that the U-shape projections are formed. The U-projections are used as the first polar tooth sets 113 and 114. The first polar tooth set 113 is upwards warped from the inside portion of the flat portion 110c of the stator cap 110 disposed in the bottom portion of the motor, warped inwards in substantially the central portion, and downwards warped. On the other hand, the first polar tooth set 114 is downwards warped from the flat portion 111c of the stator cap 111 disposed on the upper surface of the motor, warped inwards in substantially the central portion, and upwards warped.

The first polar tooth sets 113 and 114 have roots disposed on the outside of the magnets 115 and 116 to constitute TA1', TA3', TA5', . . . , which form a portion of the first polar tooth row. The leading ends are disposed on the inside of the magnets 115 and 116 to constitute TB1', TB2', TB3', . . . , which form a portion of the second polar tooth row. In this modification, a bridge-like portion for connecting TA1', TA3', TA5', . . . , serving as the first polar tooth row and TB1', TB3', TB5', . . . , serving as the second polar tooth row is formed in the central portion. Therefore, this modification is structured such that the cylindrical magnet is sectioned into upper and lower portions by the bridge-like portion. That is, the magnet 115 is supported by a disc-like rotation support portion 117 having a lower end portion secured to the rotating shaft 52. The magnet 116 is supported by a disc-like rotation support portion 118 having an upper end portion secured to the rotating shaft 52. Moreover, the foregoing bridge-like portion is formed between the magnets 115 and 116.

In the second modification, four stacked cores 120, 121, 122 and 123 are disposed in the central portion of the motor. A polar tooth 120a disposed on the outside of the magnet 115 is formed on the inside of the core 120 disposed at the lowermost portion. A polar tooth 121a disposed on the inside of the magnet 115 is formed on the inside of the core 121 disposed in the central portion. A polar tooth 122a disposed on the inside of the magnet 116 is formed on the inside of the core 122 disposed in the second portion from the uppermost portion, that is, in the central portion. A polar tooth 123a disposed on the outside of the magnet 116 is formed on the inside of the core 123 disposed in the uppermost portion.

The polar tooth 120a and the polar tooth 121a form a pair and disposed on the inside and outside of the magnet 115 so as to constitute the second polar tooth set 91. The polar tooth 122a and the polar tooth 123a form a pair and disposed on the inside and outside of the magnet 116 so as to constitute the second polar tooth set 92. In the second modification, the outer polar teeth of the first polar tooth set 81 provided for the stator cap 110 and the polar teeth 120a provided for the core 120 are alternately disposed on the outside of the magnet 115 so that the first polar tooth row TA1', TA2', TA3', . . . , is constituted. The outer polar teeth of the first polar tooth set 81 provided for the stator cap 111 and the polar teeth 123a provided for the core 123 are alternately disposed on the outside of the magnet 116 so that the first polar tooth row TA1', TA2', TA3', . . . , is constituted. The inner polar teeth of the first polar tooth set 81 provided for the stator cap 110 and the polar teeth 121a provided for the core 121 are alternately disposed on the inside of the magnet 115 so that the second polar tooth row TB1', TB2', TB3', . . . , is constituted. The inner polar teeth of the first polar tooth set 81 provided for the stator cap 111 and the polar teeth 122a provided for the core 122 are alternately disposed on the inside of the magnet 116 so that the second polar tooth row TB1', TB2', TB3', . . . , is constituted.

Figure 12:
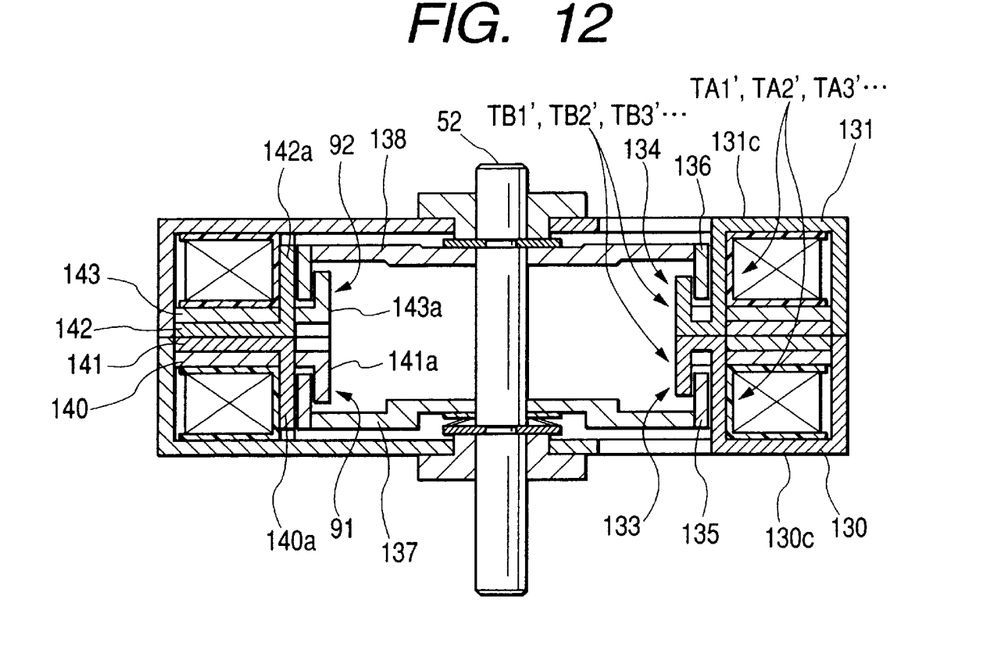
FIG. 12 is a cross sectional view showing the structure of a third modification of the motor according to the second embodiment of the present invention.

FIG. 12 shows a third modification of the second embodiment. Referring to FIG. 12, first polar tooth sets 133 and 134 constituted by U-shape projections are disposed on the inside of each of the stator caps 130 and 131 (corresponding to the stator caps 60 and 61 according to the second embodiment). That is, this modification is structured such that the inside portions of flat portions 130c and 131c of the stator caps 130 and 131 are extended so that the U-shape projections are formed. The U-shape projections are formed into the first polar tooth sets 133 and 134. The first polar tooth set 133 is upwards warped from the stator cap 130 disposed in the bottom of the motor. Moreover, the first polar tooth set 133 is warped inwards in substantially the central portion. Then, the first polar tooth set 133 is downwards warped. On the other hand, the first polar tooth set 134 is downwards warped from the stator cap 131 disposed on the upper surface of the motor, and then warped inwards in substantially the central portion. Moreover, the first polar tooth set 134 is warped upwards.

The first polar tooth sets 133 and 134 have roots disposed in the outside portions of the magnets 135 and 136 to constitute TA1', TA2', TA3', . . . , which form a portion of the first polar tooth row. The leading ends of the first polar tooth sets 133 and 134 are disposed in the inside portions of the magnets 135 and 136 to constitute TB1', TB2', TB3', . . . , which form a portion of the second polar tooth row. In this modification, a bridge portion for connecting TA1', TA3', TA5', . . . , serving as the first polar tooth row and TB1', TB3', TB5', . . . , serving as the rotor 2 to one another is formed in the central portion. Therefore, this modification is structured such that the cylindrical magnet is sectioned into an upper portion and a lower portion by the bridge portion. That is, the lower end portion of the magnet 135 is supported by the disc-like rotation support portion 137 secured to the rotating shaft 52. The upper end portion of the magnet 136 is supported by the disc-like rotation support portion 138 secured to the rotating shaft 52. The foregoing bridge portion is formed between the magnets 135 and 136.

In the third modification, four stacked cores 140, 141, 142 and 143 are disposed in the central portion of the motor. A polar tooth 140a disposed on the inside of the magnet 135 is formed on the inside of the core 140 disposed in the lowermost portion. A polar tooth 141a disposed on the outside of the magnet 135 inserted into the lowermost core 140 is formed above the core 140, that is, on the inside of the core 141 disposed in the central portion. A polar tooth 142a disposed on the outside of the magnet 136 inserted into the uppermost core 143 is formed in the second portion from the uppermost portion, that is, on the inside of the core 142 disposed in the central portion. A polar tooth 143a disposed on the inside of the magnet 136 is formed on the inside of the core 143 disposed in the uppermost portion.

The polar tooth 140a and the polar tooth 141a forming a pair are disposed on the inside and outside of the magnet 135 to constitute the above-mentioned second polar tooth set 91. The polar tooth 142a and the polar tooth 143a forming a pair are disposed on the inside and outside of the magnet 136 to constitute the above-mentioned second polar tooth set 92. In the third modification, the outer polar teeth of the first polar tooth set 133 provided for the stator cap 130 and the polar teeth 141a provided for the core 141 are alternately disposed on the outside of the magnet 135 so that the first polar tooth row TA1', TA2', TA3', . . . , is constituted. The outer polar teeth of the first polar tooth set 134 provided for the stator cap 131 and the polar teeth 142a provided for the core 142 are alternately disposed on the outside of the magnet 136 so that the first polar tooth row TA1', TA2', TA3', . . . , is constituted. The inner polar teeth of the first polar tooth set 133 provided for the stator cap 130 and the polar teeth 140a provided for the core 140 are alternately disposed on the inside of the magnet 135 so that the second polar tooth row TB1', TB2', TB3', . . . , is constituted. The inner polar teeth of the first polar tooth set 134 provided for the stator cap 131 and the polar teeth 143a provided for the core 143 are alternately disposed on the inside of the magnet 136 so that the second polar tooth row TB1', TB2', TB3', . . . , is constituted.

Figure 13:
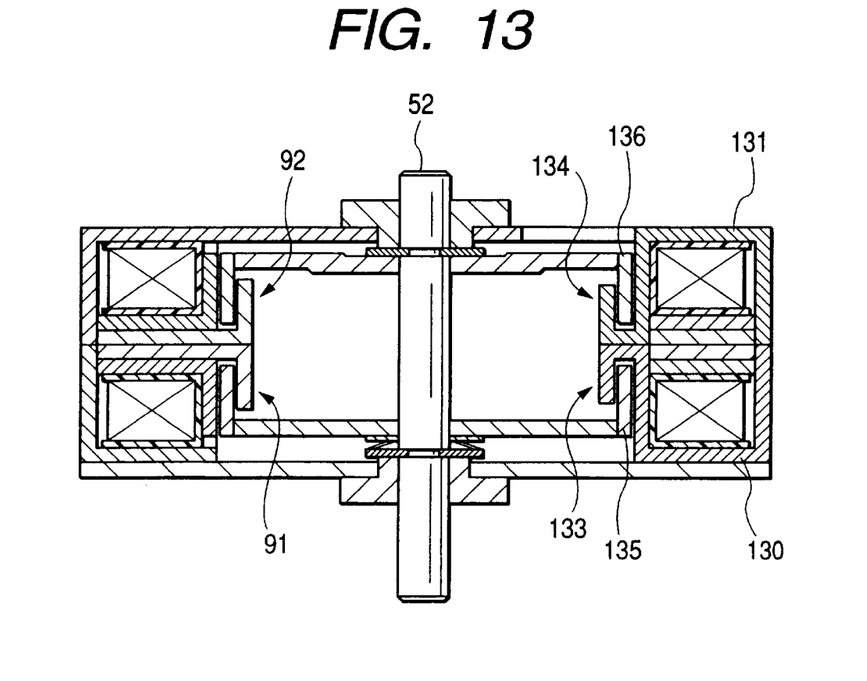
FIG. 13 is a cross sectional view showing another modification of the embodiment shown in FIG. 12.

FIG. 13 shows a structure that an individual joining plate 144 is secured to the lowermost portion (below the stator cap 130 disposed in the lower portion) of the motor shown in FIG. 12. The foregoing joining plate 144 may be employed in the modification shown in FIG. 11.

As described above, the present invention has the structure that the first polar tooth set formed in the U-shape is provided for one core. Moreover, the second polar tooth set consisting of the two polar teeth each of which is provided for the other core is formed. Thus, a variety of structures can be formed.

Although the magnet according to each embodiment of the present invention is the magnet made of a rare earth material, the material is not limited to the foregoing material. For example, ferrite magnet may be employed. Moreover, the magnet and the boss may be integrally molded by a magnetic material.

In each of the embodiments, the stator portion has a structure that one pair of the cores are stacked to form a two-stage shape. A stepping motor constituted by only one pair of cores may be employed. The present invention may be applied to another motor, such as a single-layer AC synchronization motor having a small size as a substitute for the stepping motor. Note that the single-layer AC synchronization motor having a small size also serves as an example of a cylindrical magnet having an opened end.

As described above, the claimed motor has the structure that the first polar tooth row and the second polar tooth row are disposed in the circumferential direction on the inside and outside of the magnet across the magnet. The opposite polar teeth of the first polar tooth row and the second polar tooth row are magnetized to different polarities. Moreover, the inside and outside of the magnet are magnetized to different polarities. Therefore, magnetic flux efficiently flows between the opposite polar teeth. Thus, waste of the magnetic flux which acts on the magnet can be prevented. Moreover, acting force on the magnetic flux of the magnet can be enlarged. As a result, a high speed and large torque motor can be realized.

What is claimed is:

1. A motor comprising:
   a rotor containing a cylindrical magnet having segments magnetized at predetermined pitches in a circumferential direction thereof, each of said magnetized segments being magnetized such that an inner portion and an outer portion are magnetized to different polarities and said magnetized segments disposed at adjacent pitches are magnetized to opposite polarities; and
   a stator for imparting a rotating magnetic field to said magnet so as to rotate said rotor, said stator containing a first polar tooth row and a second polar tooth row, each of which is constituted by polar teeth corresponding to the predetermined pitches of said magnetized segment such that the polar teeth disposed opposite to said magnetized segments across said magnet are magnetized to different polarities, and the polarities of said first polar tooth row and said second polar tooth row being switched so that a rotating magnetic field is imparted to said cylindrical magnet, wherein said polar teeth of said first polar tooth row are magnetized to the same polarity and said polar teeth of said second polar tooth row are magnetized to the same polarity which is different from the polarity of said first polar tooth row.

2. A motor according to claim 1, wherein the pitches (P) of said magnetized segments are the same in the circumferential direction, and the length (W) of said polar teeth in the circumferential direction satisfies a following condition: $P<W<2P$.

3. A motor comprising:

a rotor containing a cylindrical magnet having segments magnetized at predetermined pitches in a circumferential direction thereof, each of said magnetized segments being magnetized such that an inner portion and an outer portion are magnetized to different polarities and said magnetized segments disposed at adjacent pitches are magnetized to opposite polarities; and a stator for imparting a rotating magnetic field to said magnet so as to rotate said rotor, said stator containing a first polar tooth row and a second polar tooth row, each of which is constituted by polar teeth corresponding to the predetermined pitches of said magnetized segments such that the polar teeth disposed opposite to said magnetized segments across said magnet are magnetized to different polarities, and the polarities of said first polar tooth row and said second polar tooth row being switched so that a rotating magnetic field is imparted to said cylindrical magnet, wherein said first polar tooth row is provided for a stator member for holding a wound coil portion which constitutes a portion of said stator, said second polar tooth row is provided for a member which constitutes a portion of a case of said motor, said stator member which is provided with said first polar tooth row having a surface opposite to the outer surface of said magnet, said first polar tooth row is disposed in the circumferential direction of the outer surface of said magnet, said member provided with said second polar tooth row and constituting a portion of said case of said motor having a plate surface which covers at least an opened end of said magnet, a projection formed to project over said member toward the inside portion of said magnet is provided, and said second polar tooth row is disposed at a position opposite to the inner surface of said magnet and opposite to said first polar tooth row.

4. A motor according to claim 3, wherein the pitches (P) of said magnetized segments are the same in the circumferential direction, and the length (W) of said polar teeth in the circumferential direction satisfies a following condition: $P<W<2P$.

5. A motor comprising:

a rotor incorporating a cylindrical magnet structured such that at least an end thereof is opened, the magnet having a plurality of segments magnetized at predetermined pitches in the circumferential direction, and magnetized such that an inside portion and an outside portion thereof have different polarities;

a stator portion formed to surround the outer surface of said magnet of said rotor in the circumferential direction of said magnet;

a first polar tooth row constituted by a plurality of polar teeth formed at a predetermined interval from the outer surface of said magnet and arranged to form a row in the circumferential direction of the outer surface of said magnet; and a second polar tooth row constituted by a plurality of polar teeth formed at a predetermined interval from the inner surface of said magnet and arranged to form a row in the circumferential direction of the inner surface of said magnet, wherein said polar teeth constituting said first polar tooth row and said polar teeth constituting said second polar tooth row are disposed opposite to one another across said magnetized segment portion of said magnet, and magnetization is performed such that said polar teeth disposed opposite to each other are magnetized to different polarities, wherein said polar teeth of said first polar tooth row are magnetized to the same polarity, and said polar teeth of said second polar tooth row are magnetized to the same polarity which is different from the polarity of said first polar tooth row.

6. A motor according to claim 5, wherein the pitches (P) of said magnetized segments are the same in the circumferential direction, and the length (W) of said polar teeth in the circumferential direction satisfies a following condition: $P<W<2P$.

7. A motor comprising:

a rotor incorporating a cylindrical magnet structured such that at least an end thereof is opened, the magnet having a plurality of segments magnetized at predetermined pitches in the circumferential direction, and magnetized such that an inside portion and an outside portion thereof have different polarities;

a stator portion formed to surround the outer surface of said magnet of said rotor in the circumferential direction of said magnet;

a first polar tooth row constituted by a plurality of polar teeth formed at a predetermined interval from the outer surface of said magnet and arranged to form a row in the circumferential direction of the outer surface of said magnet; and a second polar tooth row constituted by a plurality of polar teeth formed at a predetermined interval from the inner surface of said magnet and arranged to form a row in the circumferential direction of the inner surface of said magnet, wherein said polar teeth constituting said first polar tooth row and said polar teeth constituting said second polar tooth row are disposed opposite to one another across said magnetized segment portion of said magnet, and magnetization is performed such that said polar teeth disposed opposite to each other are magnetized to different polarities; and wherein said first polar tooth row is provided for a stator member for holding a wound coil portion which constitutes a portion of said stator, said second polar tooth row is provided for a member which constitutes a portion of a case of said motor, said stator member which is provided with said first polar tooth row having a surface opposite to the outer surface of said magnet, said first polar tooth row is disposed in the circumferential direction of the outer surface of said magnet, said member provided with said second polar tooth row and constituting a portion of said case of said motor having a plate surface which covers at least an opened end of said magnet, a projection projecting over said member toward the inside portion of said magnet is provided, and said second polar tooth row is disposed at a position opposite to the inner surface of said magnet and opposite to said first polar tooth row.

8. A motor according to claim 7, wherein the pitches (P) of said magnetized segments are the same in the circumferential direction, and the length (W) of said polar teeth in the circumferential direction satisfies a following condition: P<W<2P.

9. A motor comprising:

a rotor incorporating a cylindrical magnet having segments magnetized at predetermined pitches in the circumferential direction, and the inner portion and the outer portion of said magnetized segments are magnetized to the same polarity and the adjacent magnetized segments are magnetized to different polarities;

a stator for imparting a rotating magnetic field to said magnet to rotate said rotor;

a first polar tooth row constituted by a plurality of polar teeth formed apart from the outer surface of said magnet for a predetermined distance and arranged to form a row in the circumferential direction of the outer surface of said magnet and a second polar tooth row constituted by a plurality of polar teeth formed apart from the inner surface of said magnet and arranged to form a row in the circumferential direction of the inner surface of said magnet are provided: and polar teeth sets having polar teeth disposed opposite to each other across said magnet are constituted by first and second polar teeth sets having polar teeth that are magnetized to the same polarity within each teeth set which is different from the polarity of adjacent polar teeth sets, and said first and second polar teeth sets magnetized to the different polarities are alternately disposed in the circumferential direction, when said first and second polar tooth rows are arranged, wherein said first polar teeth set is constituted by bending one core member which forms a portion of said stator into a U-shape, said second polar teeth set is constituted by two polar teeth constituted by bending another core member, and said two polar teeth constituting said second polar teeth set are constituted by bending two core members disposed to be superimposed in the axial direction of said motor.

10. A motor according to claim 9, wherein said stator incorporates two coils disposed to be superimposed in the axial direction, said first polar teeth set is provided for an inner core sandwiched by the two coils, and said second polar teeth set is provided for each of outer cores formed at the two axial-directional ends of said stator.

11. A motor according to claim 10, wherein said second polar teeth set is structured such that the polar teeth provided for said core member constituting said outer core and a portion of said case of said motor are disposed on the outside of said magnet, and said polar teeth provided for the other core member disposed to be superimposed on said core member are disposed on the inside of said magnet.

12. A motor comprising:

a rotor incorporating a cylindrical magnet having segments magnetized at predetermined pitches in the circumferential direction, and the inner portion and the outer portion of said magnetized segments are magnetized to the same polarity and the adjacent magnetized segments are magnetized to different polarities;

a stator for imparting a rotating magnetic field to said magnet to rotate said rotor;

a first polar tooth row constituted by a plurality of polar teeth formed apart from the outer surface of said magnet for a predetermined distance and arranged to form a row in the circumferential direction of the outer surface of said magnet and a second polar tooth row constituted by a plurality of polar teeth formed apart from the inner surface of said magnet and arranged to form a row in the circumferential direction of the inner surface of said magnet are provided; and polar teeth sets having polar teeth disposed opposite to each other across said magnet are constituted by first and second polar teeth sets having polar teeth that are magnetized to the same polarity within each teeth set which is different from the polarity of adjacent polar teeth sets, and said first and second polar teeth sets magnetized to the different polarities are alternately disposed in the circumferential direction, when said first and second polar tooth rows are arranged, wherein said first polar teeth set includes a root portion formed into a trapezoid tapered toward the leading end thereof and a leading end portion having the width which is the shortest width of said trapezoid, said root portion is disposed in said first polar tooth row which is the outer portion of said magnet and said leading end portion is disposed in said second polar tooth row which is warped into a U-shape and which is the inside portion of said magnet.

* * * * *